United States Patent

[11] 3,581,158

[72] Inventor Jerry Shirek
P.O. Box 1861, Monterey, Calif. 93940
[21] Appl. No. 825,584
[22] Filed May 19, 1969
[45] Patented May 25, 1971

[54] VARIABLE STACK ELECTRICAL CONDENSER
6 Claims, 3 Drawing Figs.

[52] U.S. Cl. .......... 317/230, 317/242
[51] Int. Cl. .......... H01g 9/08, H01g 1/02
[50] Field of Search .......... 317/230, 231, 233, 261, 242

[56] References Cited
UNITED STATES PATENTS

| | | | |
|---|---|---|---|
| 2,952,805 | 9/1960 | Darnfeld | 317/242 |
| 3,014,167 | 12/1961 | Winter et al. | 317/242 |
| 3,020,453 | 2/1962 | Hogue | 317/230 |
| 3,159,776 | 12/1964 | Metcalf | 317/230 |
| 3,177,415 | 4/1965 | Kater | 317/261 |

*Primary Examiner*—James D. Kallam
*Attorney*—Paul Bliven

ABSTRACT: One or more toroidally shaped electrical condensers are mounted on a standard base unit provided centrally thereof with an externally threaded post that is coaxial of the condensers. A nut threaded on the post holds the condensers on the post and against the base. Metal cases for the condensers form their ground connections and all the cases ground to a peripheral metal band on the base. Contact strips are secured longitudinally of the post and are electrically connected to the base terminals. Each condenser has a spring tab forming its other connection that contacts one of the strips.

INVENTOR.
Jerry Shirek
BY Paul Bliven

VARIABLE STACK ELECTRICAL CONDENSER

FIELD OF THE INVENTION

The present invention relates to a type of condenser found in radio and television sets, particularly small electrolytic condensers, and particularly to the so-called twist-prong-base condensers. The main feature of the invention is the provision of a base structure mountable in a radio or television chassis, and which base structure may have selectively incorporated therewith condenser units of various capacities, either one or more than one unit.

DESCRIPTION OF THE PRIOR ART

The prior art discloses toroidally shaped condensers having terminal pigtails leading therefrom. The art does not disclose a base upon which condenser units of various capacities may be mounted or mounted on such a base by a mere placing without a distinct step of forming electrical connections over and above the placing of the condenser on a base.

Thus it is an object of the present invention to devise condenser units that may be assembled together and electrically connected into one or more circuits by a mere positioning act without a separate step or steps of making such connection or connections.

Another object of the present invention is the devising of an electrical condenser base having means for securing it in a fixed position in a chassis, said base having terminals and leads to said terminals, and said base adapted to have assembled therewith condenser units that will make electrical contact with such leads by the mere insertion of such condensers onto said base.

A further object of the present invention is the combination of the base and condensers set forth in the above objects of the invention.

SUMMARY

The above-mentioned lacks of the prior art are remedied and the above objects achieved by the construction of electrical condensers having toroidal shapes and by providing each condenser with particularly located contacts fixed on the surface thereof, one contact being a peripheral metal band on the condenser and the other being an axially arranged tab in the central opening of the condenser; and by the stacking of such condensers on a base provided with a post extending thru the openings of such condensers. Each base may have much the same construction as the standard twist-prong construction with the addition of the post that extends oppositely of the twist prongs and terminals and is central of the base. The post is externally threaded and is in section a quadrefoil with a contact strip in each of the recesses between adjacent lobes. Each strip extends axially of the post and is electrically connected to one of the terminals. A nut is threaded on the post to clamp the condensers together and to the base so that all their peripheral rings are in electrical contact and in contact with the base ring that functions as a ground. Each condenser axial tab contacts a post strip, the particular strip being a matter of choice.

BRIEF DESCRIPTION OF THE DRAWING

A device such as briefly described above and in a preferred form thereof is hereinafter described in detail and illustrated in the accompanying drawing, in which.

DESCRIPTION OF THE PREFERRED EMBODIMENT

Figure 1:
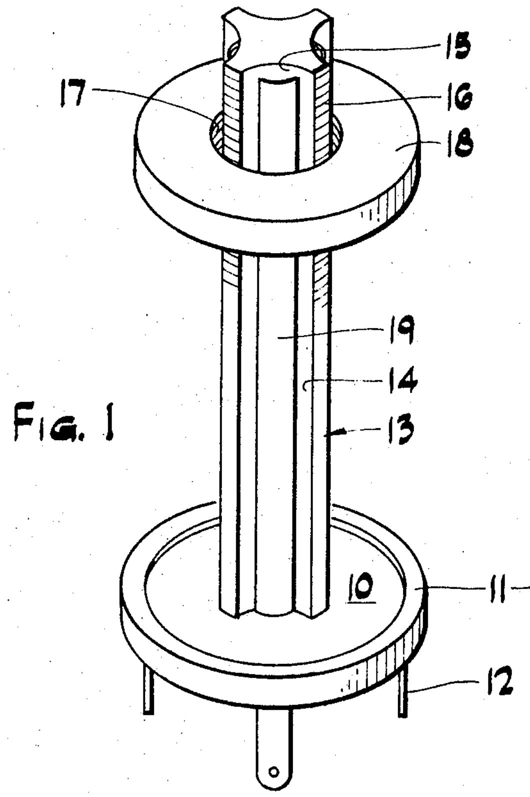
FIG. 1 is an isometric view of a condenser base illustrating a preferred form of the invention.
Figure 3:
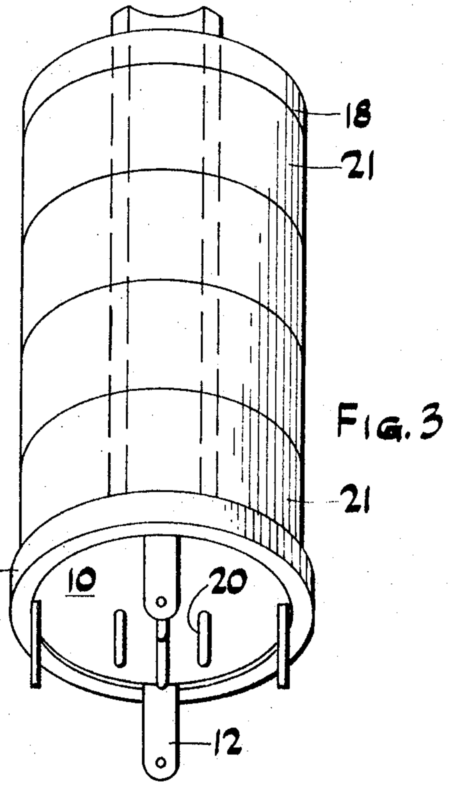
FIG. 3 is an isometric view of the base of FIG. 1 having assembled therewith four condensers such as illustrated in FIG. 2.
Figure 2:
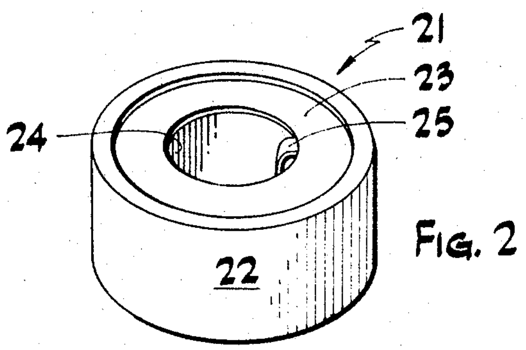
FIG. 2 is an isometric view of a condenser illustrating a preferred form of the invention.

FIGS. 1, 2, and 3 are views illustrating a preferred embodiment of the invention. FIG. 3 is an assembly of the base shown in FIG. 1 with four of the condensers shown in FIG. 2.

The base unit illustrated in FIG. 1 comprises a base disc 10 of electrical insulating material having a metallic rim 11 with rolled in edges, flanged edges, that secure it to the disc. Integral with the rim and depending therefrom are four twist prongs 12 spaced equally around the rim. The ground connection to the base unit and the condensers carried thereon is made to one of these twist prongs.

Secured centrally of the disc 10 and extending normal to the upper face in a direction opposite to that of the prongs 12 is a post 13. This post may be integral with the disc 10 and formed of the same insulating material. The post is long with respect to its transverse dimension. The post has a quadrefoil cross section resulting in there being four longitudinal ribs 14, or lobes, and four grooves 15, one between adjacent ribs. The faces of the ribs form the outer surface of the post and this surface is formed with a male screw thread 16 that cooperates with the female screw thread 17 on the bore surface of a nut 18 threaded on the post 13 and formed of the same material as post and disc.

Secured in each of the grooves 15, and extending therealong, is a narrow strip of electrical conducting material 19. Thus there are four of these strips, and they are electrically connected to four terminals 20 extending downwardly from and secured in the insulating base disc 10, each strip 19 individual to one of the terminals 20.

FIG. 2 shows the details of a condenser 21 pertinent to the present invention, generally these will be electrolytic condensers. The condenser is provided with a peripheral metallic sleeve 22 with the two edges rolled, flanged, inward onto electrically insulating washers 23 that form the top and bottom annular outer surfaces of the condenser. The bottom ring is the same as the top ring, although not shown. Inside of the condenser, coaxial thereof, and held between and by the washers is a tube 24 formed of electrical insulating material. The space between the sleeve 22 and the tubular core 24 is occupied by the condenser's electrolytic material. Inside of the core tube 24 and extending axially thereof is a thin and narrow strip of electrical conductive material. The ends of the strip are bent over the edges of the core 24 so as to extend into the interior space of the condenser and to there form an electrical connection with the condenser's material. The strip bows radially inward of the core so that for part of its length it is radially inside of both the core's inner wall and the inner edges of the washers 23. The strip 25 forms one terminal of the condenser and the sleeve 22 forms the other terminal, the ground.

With the nut 18 unscrewed from the post, the axes of the post 13 and condenser 21 are made coaxial and the condenser is rotated about its axis to bring the contact strip 25, or tab, of the condenser in axial alignment with a desired one of the post's contact strips 19. Then the condenser may be slid downwardly onto the post with the tab 25 in contact with a post strip 19. A plurality of condensers may be placed on the post as shown in FIG. 3 and secured thereon by the nut 18. All of the condenser's tabs 25 may contact one of the posts strips 19 or each of them may contact a different strip. Each of the condensers may have the same capacity or each one may have a different capacity than the other one. All of the condensers assembled on the one base share a common ground connection through their outer sleeves 22, from one to the next, and to the base ring 11 and the twist prongs 12.

At the present state of the art, condensers are either provided with pigtails for making electrical connection thereto or they are made integral with a base having rigid terminals much in the form illustrated in FIG. 1. To obtain various values of capacitance, it is necessary to solder into a circuit several capacitors or to find a single capacitor of the right value. This has meant that suppliers of twist-prong capacitors have had to carry many different ones in stock. The present invention allows the supplier to reduce the amount of stock he needs to carry, as the number of capacitors mounted on a base may be varied and the capacitive value of each capacitor may be the same or different to be additive to many different values.

While the number of twist prongs and terminals shown in FIGS. 1 and 2 is characteristic of standard inch and three-eights twist-prong condenser, it is obvious that the present invention may be applied to the 1-inch twist-prong base or the standard male octal base.

Having thus described my invention and its functioning, I claim:

1. An electrical condenser base, comprising: a disc of electrical insulating material having upper and lower faces; a post of electrically insulating material centrally of, integral with, and extending from and normal to the upper face of said disc, said post having a groove extending longitudinally thereof; a nut formed to fit on and to coact with said post for adjusting the distance between said disc and the nut; a strip of metal extending longitudinally of and retained in said groove; a first terminal electrically connected to said strip and extending downward from the lower face of said disc; on the upper face of said disc, a metal member electrically insulated from said first terminal; and a second terminal electrically connected to said metal member and extending downward from the lower face of said disc.

2. The combination of claim 1 in which said second terminal is a portion of a ring peripherally contacting said disc and having its edge portions flanged onto the upper and lower faces thereof.

3. The combination of claim 1 in which there are a plurality of said grooves spaced around said post, a corresponding strip in each of said grooves, and a corresponding first terminal connected to each of said strips.

4. In combination with the condenser base of claim 1, a condenser of toroidal form with an interior axial bore surface and upper and lower exterior surfaces transverse said bore surface, an electrically conductive resilient contact in said bore and adjacent said bore surface forming a first terminal of said condenser, and electrically conductive material on said upper and lower surfaces forming a second terminal of said condenser, the post of said base received in said bore with said first terminal of said condenser in contact with said strip of metal, with said second terminal of said condenser in contact with said metal member on the upper face of said disc, and with said nut engaging said post and retaining said condenser in electrically connected position on said base.

5. A condenser of toroidal form with an interior axial bore surface and upper and lower exterior surfaces transverse said bore surface, an electrically conductive resilient contact in said bore and adjacent said bore surface forming a first terminal of said condenser, and electrically conductive material on said upper and lower surfaces forming a second terminal of said condenser.

6. The combination of claim 5 in which said conductive material on said upper and lower surfaces are portions of a ring peripherally contacting said condenser and having its edge portions flanged onto said surfaces.